US006261711B1

(12) United States Patent
Matlock et al.

(10) Patent No.: US 6,261,711 B1
(45) Date of Patent: Jul. 17, 2001

(54) SEALING SYSTEM FOR FUEL CELLS

(75) Inventors: Richard R. Matlock, Catskill; Donald G. Buesing, Balston Spa, both of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/396,158

(22) Filed: Sep. 14, 1999

(51) Int. Cl.[7] .................................................. H01M 2/08
(52) U.S. Cl. ................... 429/34; 429/12; 429/13; 429/17; 429/30; 429/33; 429/35; 429/36
(58) Field of Search .......................... 429/12, 13, 17, 429/30, 35, 36, 33, 34, 38, 210

(56) References Cited

U.S. PATENT DOCUMENTS

| | | | |
|---|---|---|---|
| 4,169,917 | 10/1979 | Baker et al. | 429/26 |
| 4,269,642 | 5/1981 | DeCasperis et al. . | |
| 4,365,008 | 12/1982 | DeCasperis et al. . | |
| 4,505,992 | 3/1985 | Dettling et al. . | |
| 4,588,661 | 5/1986 | Kaufman et al. . | |
| 4,604,331 | 8/1986 | Louis . | |
| 4,738,905 | 4/1988 | Collins . | |
| 4,774,154 | 9/1988 | Singelyn et al. | 429/36 |
| 4,795,536 | 1/1989 | Young et al. | 204/129 |
| 4,797,185 | 1/1989 | Polak et al. | 204/129 |
| 4,824,741 | 4/1989 | Kunz | 429/26 |
| 4,973,530 | 11/1990 | Vanderborgh et al. | 429/13 |
| 4,988,583 | 1/1991 | Watkins et al. | 429/30 |
| 5,110,691 | 5/1992 | Krasij et al. | 429/35 |
| 5,176,966 | 1/1993 | Epp et al. . | |
| 5,219,674 | 6/1993 | Singelyn et al. | 429/36 |
| 5,230,966 | 7/1993 | Voss et al. . | |
| 5,262,249 | 11/1993 | Beal et al. | 429/26 |
| 5,262,250 | 11/1993 | Watanabe | 429/33 |
| 5,264,299 | 11/1993 | Krasij et al. | 429/30 |
| 5,284,718 | * 2/1994 | Chow et al. | 429/26 |
| 5,300,370 | 4/1994 | Washington et al. | 429/34 |
| 5,382,478 | 1/1995 | Chow et al. | 429/26 |
| 5,432,021 | 7/1995 | Wilkinson et al. | 429/17 |
| 5,441,621 | 8/1995 | Molter et al. . | |
| 5,464,700 | 11/1995 | Steck et al. | 429/30 |
| 5,482,680 | 1/1996 | Wilkinson et al. | 422/177 |
| 5,523,175 | 6/1996 | Beal et al. | 429/30 |
| 5,529,855 | 6/1996 | Watanabe | 429/34 |
| 5,547,776 | 8/1996 | Fletcher et al. | 429/13 |
| 5,733,682 | 3/1998 | Quadakkers et al. | 429/210 |
| 5,773,160 | 6/1998 | Wilkinson et al. | 429/13 |
| 5,789,094 | 8/1998 | Kusunoki et al. . | |
| 5,840,414 | 11/1998 | Bett et al. | 428/307.7 |
| 5,853,909 | 12/1998 | Reiser | 429/13 |
| 5,858,567 | 1/1999 | Spear, Jr. et al. | 429/12 |
| 5,863,671 | 1/1999 | Spear, Jr. et al. | 429/12 |
| 5,928,807 | * 7/1999 | Elias | 429/35 |
| 6,007,931 | 12/1999 | Fuller et al. | 429/13 |
| 6,013,385 | 1/2000 | DuBose | 429/17 |
| 6,057,054 | * 5/2000 | Barton et al. | 429/42 |

FOREIGN PATENT DOCUMENTS 0041294 12/1981 (EP) .
2000133288 * 5/2000 (JP) .

* cited by examiner

Primary Examiner—Gabrielle Brouillette
Assistant Examiner—Dah-Wei Yuan
(74) Attorney, Agent, or Firm—Fish & Richardson P.C.

(57) ABSTRACT

A fluid seal for a fuel cell includes a compressible member on a first fluid flow plate and a gasket disposed within a groove on a second fluid flow plate. The compressible member conforms to a surface of the gasket to form the fluid seal as the two fluid flow plates are compressed together.

21 Claims, 8 Drawing Sheets

SEALING SYSTEM FOR FUEL CELLS

This invention relates generally to fuel cells and more specifically to an improved sealing system between the fluid flow plates in such cells.

BACKGROUND OF THE INVENTION

A fuel cell is a device which converts chemical energy of a fuel into electrical energy, typically by oxidizing the fuel. In general a fuel cell includes an anode and a cathode separated by an electrolyte. When fuel is supplied to the anode and oxidant is supplied to the cathode, the electrolyte electrochemically generates a useable electric current which is passed through an external load. The fuel typically supplied is hydrogen and the oxidant typically supplied is oxygen. In such cells, the electrolyte combines the oxygen and hydrogen to form water and to release electrons. The chemical reaction for a fuel cell using hydrogen as the fuel and oxygen as the oxidant is shown in equation (1).

$$H_2 + \tfrac{1}{2}O_2 \rightarrow H_2O \tag{1}$$

This process occurs through two redox or separate half-reactions which occur at the electrodes:
Anode Reaction $$H_2 \rightarrow 2H^+ + 2e^- \tag{2}$$

Cathode Reaction $$\tfrac{1}{2}O_2 + 2H^+ + 2e^- \rightarrow H_2O \tag{3}$$

In the anode half-reaction, hydrogen is consumed at the fuel cell anode releasing protons and electrons as shown in equation (2). The protons are injected into the fuel cell electrolyte and migrate to the cathode. The electrons travel from the fuel cell anode to cathode through an external electrical load. In the cathode half-reaction, oxygen, electrons from the load, and protons from the electrolyte combine to form water as shown in equation (3). The directional flow of protons, such as from anode to cathode, serves as a basis for labeling an "anode" side and a "cathode" side of the fuel cell.

Fuel cells are classified into several types according to the electrolyte used to accommodate ion transfer during operation. Examples of electrolytes include aqueous potassium hydroxide, concentrated phosphoric acid, fused alkali carbonate, stabilized zirconium oxide, and solid polymers, e.g., a solid polymer ion exchange membrane.

An example of a solid polymer ion exchange membrane is a Proton Exchange Membrane (hereinafter "PEM") which is used in fuel cells to convert the chemical energy of hydrogen and oxygen directly into electrical energy. A PEM is a solid polymer electrolyte which when used in a PEM-type fuel cell permits the passage of protons (i.e.,$H^+$ ions) from the anode side of a fuel cell to the cathode side of the fuel cell while preventing passage of reactant fluids such as hydrogen and oxygen gases.

Typically, a PEM-type cell includes an electrode assembly disposed between an anode fluid flow plate and a cathode fluid flow plate. An electrode assembly usually includes five components: two gas diffusion layers; two catalysts; and an electrolyte. The electrolyte is located in the middle of the five-component electrode assembly. On one side of the electrolyte (the anode side) a gas diffusion layer (the anode gas diffusion layer) is disposed adjacent the anode layer, and a catalyst (the anode catalyst) is disposed between the anode gas diffusion layer and the electrolyte. On the other side of the electrolyte (the cathode side), a gas diffusion layer (the cathode gas diffusion layer) is disposed adjacent the cathode layer, and a catalyst (the cathode catalyst) is disposed between the cathode gas diffusion layer and the electrolyte.

Several PEM-type fuel cells are arranged as a multi-cell assembly or "stack." In a multi-cell stack, multiple single PEM-type cells are connected together in series. The number and arrangement of single cells within a multi-cell assembly are adjusted to increase the overall power output of the fuel cell. Typically, the cells are connected in series with one side of a fluid flow plate acting as the anode for one cell and the other side of the fluid flow plate acting as the cathode for an adjacent cell.

The anode and cathode fluid flow plates are made of an electrically conductive material, typically metal or compressed carbon, in various sizes and shapes. Fluid flow plates act as current collectors, provide electrode support, provide paths for access of the fuels and oxidants to the electrolyte, and provide a path for removal of waste products formed during operation of the cell.

The cell also includes a catalyst, such as platinum on each side of the electrolyte for promoting the chemical reaction(s) that take place in the electrolyte in the fuel cells. The fluid flow plates include a fluid flow field of open-faced channels for distributing fluids over the surface of the electrolyte within the cell.

Fluid flow plates may be manufactured using any one of a variety of different processes. For example, one technique for plate construction, referred to as "monolithic" style, includes compressing carbon powder into a coherent mass which is subjected to high temperature processes to bind the carbon particles together, and to convert a portion of the mass into graphite for improved electrical conductivity. The mass is then cut into slices, which are formed into the fluid flow plates. Typically, each fluid flow plate is subjected to a sealing process (e.g., resin impregnation) in order to decrease gas permeation therethrough and reduce the risk of uncontrolled reactions.

Fluid flow plates also have holes therethrough which when aligned in a stack form fluid manifolds through which fluids are supplied to and evacuated from the stack. Some of the fluid manifolds distribute fuel (such as hydrogen) and oxidant (such as air or oxygen) to, and remove unused fuel and oxidant as well as product water from, the fluid flow fields of the fluid flow plates. Additionally, other fluid manifolds circulate coolant. Furthermore, other cooling mechanisms such as cooling plates are commonly installed within the stack between adjacent single cells to remove heat generated during fuel cell operation.

Typically, the PEM-type cell is sealed outside the PEM active area by compressing the membrane between an O-ring gasket disposed within a groove on the cathode side and an insulator glued to the anode side.

SUMMARY OF THE INVENTION

In general, in one aspect, the invention is a fluid seal for a fuel cell including a compressible member which conforms to a surface of a gasket to form a seal.

In another aspect, a fluid seal for a fuel cell includes a first fluid flow plate having a gasket at least partially disposed within a groove formed in a first surface and a second fluid flow plate having a compressible member bonded to a first surface of the second fluid flow plate. The first surface of the first fluid flow plate is parallel to the first surface of the second fluid flow plate and the compressible member circumscribes a pattern that mirrors the pattern formed by the groove on the first fluid flow plate. The compressible member conforms to a surface of the gasket.

In another aspect, the invention features a fluid flow plate for a fuel cell includes a plate made at least in part from an electrically conductive material having a front surface with one or more open-faced channels formed therein define a fluid flow region for carrying a reactive gas. The plate further including a supply opening and an exhaust opening, and a compressible material bonded to the plate surface around a perimeter of the fluid flow region, the supply opening, and the exhaust opening.

In yet another aspect, the invention features a method of sealing a fuel cell by compressing a first fluid flow plate towards a second fluid flow plate. The first fluid flow plate includes a gasket at least partially disposed within a groove formed in a surface of the first plate and the second fluid flow plate includes a compressible member bonded to a surface of the second fluid flow plate. The compressible member circumscribes a pattern that mirrors the pattern formed by the groove on the first fluid flow plate, and the compressible member conforms to a surface of the gasket as the fluid flow plates are compressed together.

Embodiments may include one or more of the following. The fluid seal further includes an electrolyte membrane secured between the gasket and the compressible member. The groove circumscribes a perimeter of a fluid flow region of the first fluid flow plate. The seal can further include an electrolyte membrane secured between the gasket and the compressible member about the perimeter of the fluid flow region. The first and second fluid flow plates each can include a fluid supply hole and a fluid exhaust hole. The groove can circumscribe the fluid supply hole, the fluid exhaust hole, and a perimeter of a fluid flow region on the first fluid flow plate. The compressible member can stick to the electrolyte membrane to help form the fluid seal. The second fluid flow plate can also include a roughened region to which the compressible member is bonded, e.g., the fluid flow plate includes a roughened surface around the perimeter of the fluid flow region. The compressible member can be a silicone polymer. The compressible member also can be an insulator.

The invention has various advantages including, but not limited to, one or more of the following. The new sealing system including a compressible member decreases the leak rate in the PEM-type cell as compared to PEM-type cells sealed without the compressible member. The new sealing system also eliminates the use of adhesives on the anode fluid flow plate which reduces assembly time and costs. The compressible member also can act as an fluid flow plate spacer to protect the fluid flow surface during shipping and as an insulator preventing plate-to-plate shortening.

Other features and advantages of the invention will be apparent from the following detailed description, and from the claims.

DETAILED DESCRIPTION

Figure 1:
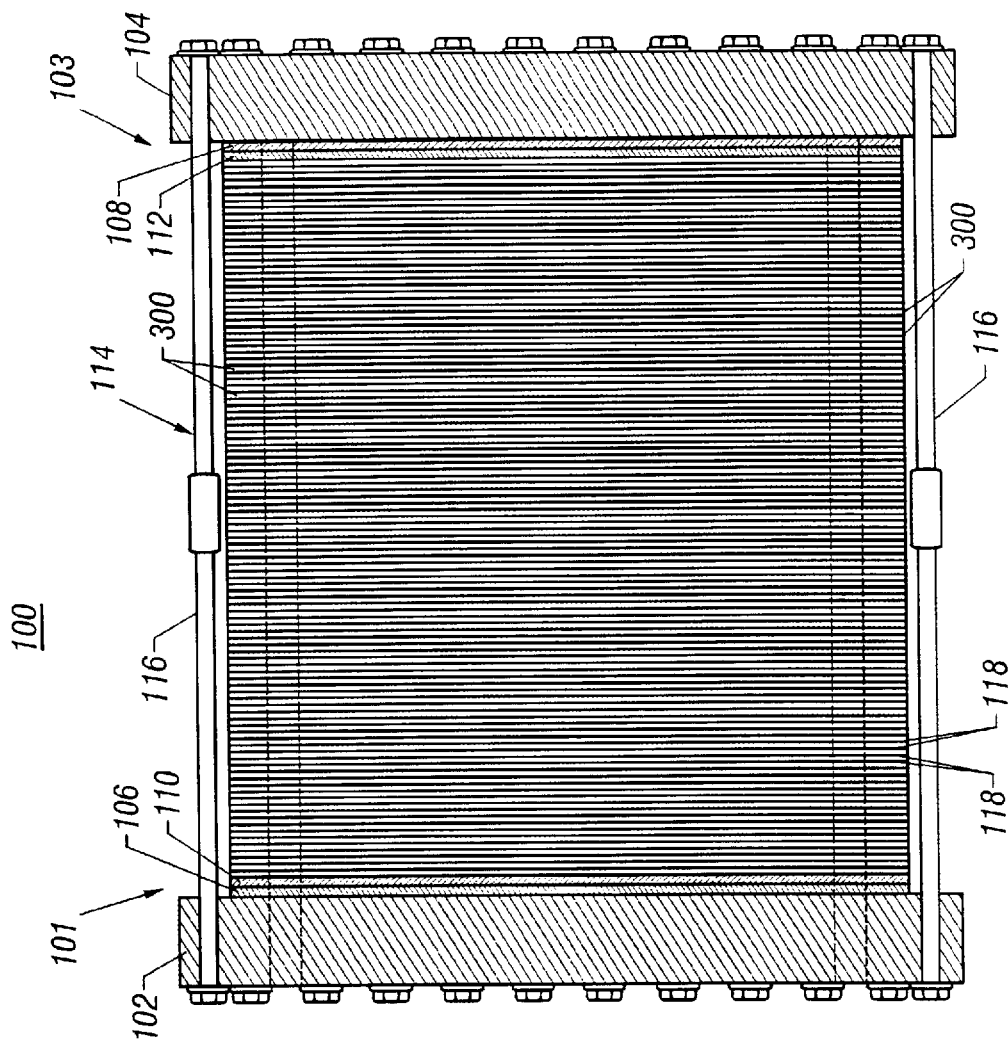
FIG. 1 is a fuel cell assembly.

FIG. 1 shows a fuel cell assembly 100 including a fuel cell stack 114 located between end assembly 101 and end assembly 103. End assembly 101 includes an end plate 102, an insulation layer 106, and a current collector/conductor plate 110 in that order. Similarly, end assembly 103 includes and end plate 104, an insulation layer 108, and a current collector/conductor plate 112. Four tie-bolts 116, join the end plates and compress the fuel cell assembly with enough pressure to create both fluid tight seals and good electrical contact between layers 118 of cell stack 114. For example, the compression pressure applied to layers of fuel cell assembly 100 can be anywhere between fifty to one thousand pounds per square inch depending on the design of the cell. Typically, 10 to 20 percent of the total compression pressure is necessary to create fluid tight seals within the cell stack assembly. The remaining 80 to 90 percent of the total compression pressure applied to the fuel cell is necessary to create good electrical contact within the cell stack assembly.

Figure 7:
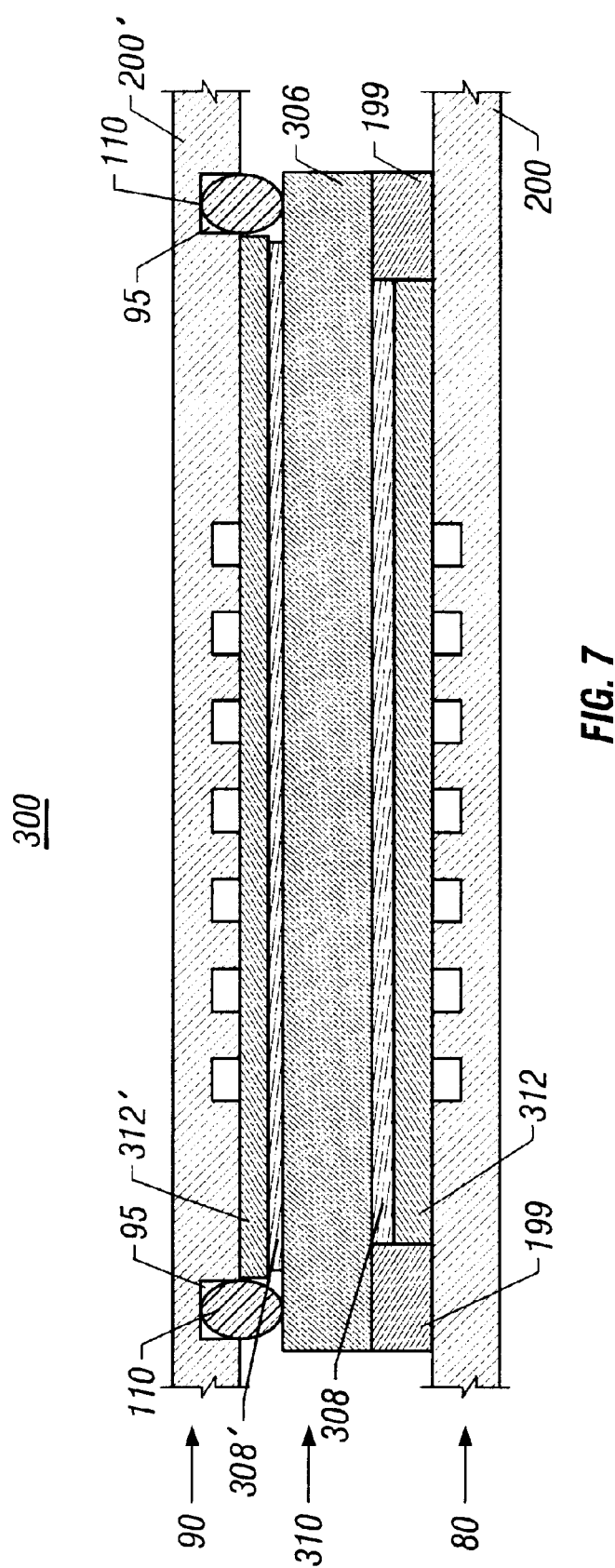
FIG. 7 is a cross-sectional view of a PEM-type cell.

Fuel cell stack 114 includes a number of layers 118 which are assembled together to form several individual PEM-type fuel cells 300, an example of which is shown in FIG. 7. Layers 118 include, for example, fluid flow plates, cooling plates, and solid electrolytes such as PEMs.

Figure 5:
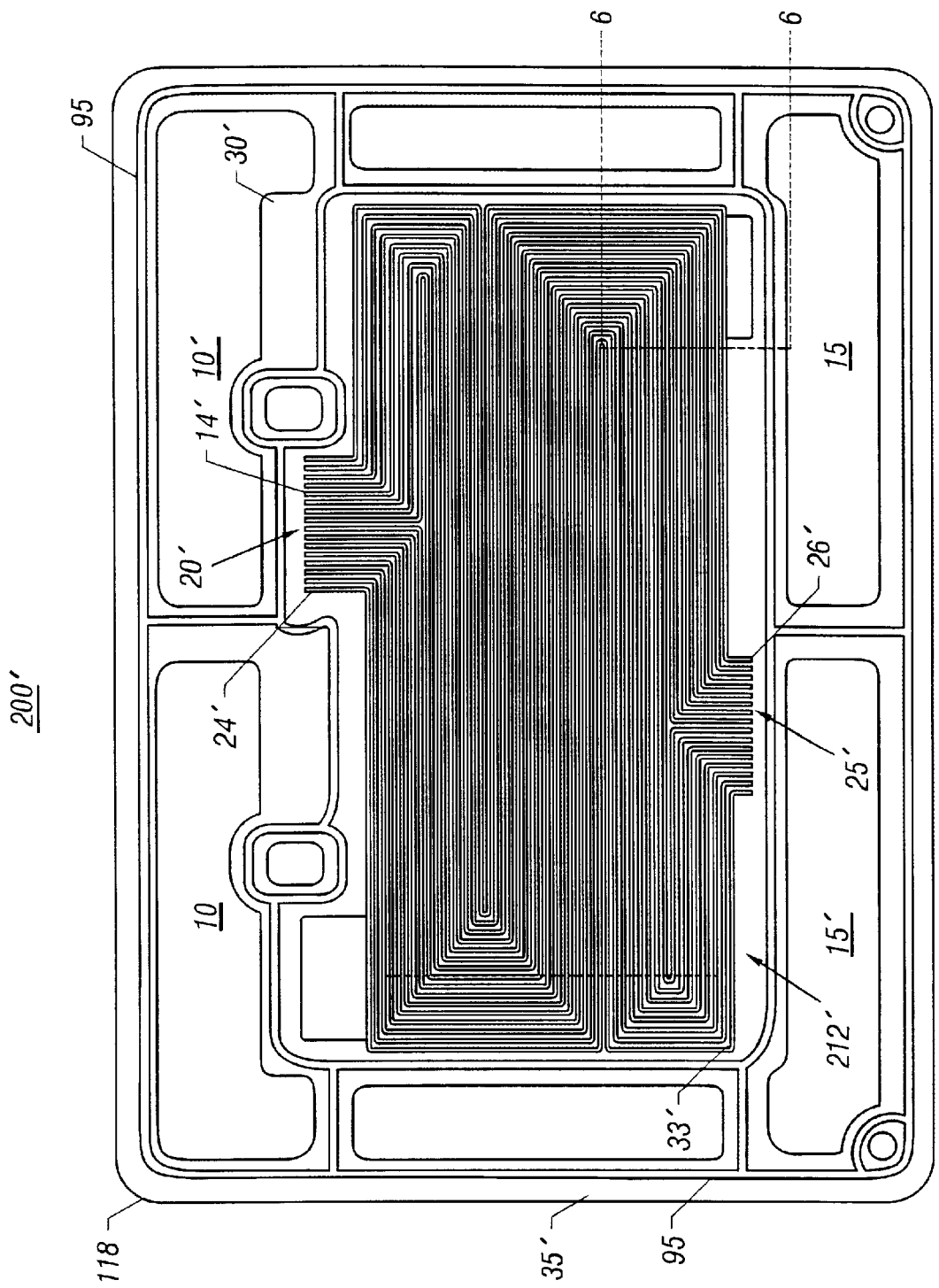
FIG. 5 is a cathode fluid flow plate of the fuel cell assembly of FIG. 1.

Each layer 118 within fuel cell stack 114 includes a fuel supply hole 10, an oxidant supply hole 10', a fuel exhaust hole 15, and an oxidant exhaust hole 15', as shown in anode fluid flow plate 200 (FIG. 2) and cathode fluid flow plate 200' (FIG. 5). Layers 118 are assembled into the fuel cell stack 114 such that the identical holes for each layer form fluid manifolds. The fluid manifolds extend along the length of the fuel cell stack 114 and are used to supply fluids to and remove fluids from the stack. A fuel manifold, for example, is formed by fuel supply holes 10 of each layer 118 within the fuel cell stack. Fuel, such as hydrogen gas, is supplied to a fluid flow region the anode side of the fuel cell by flowing the fuel along the fuel manifold, through fuel supply holes 10, inlet port 20, and into inlet end 24 of flow channel 204 (See FIGS. 2 and 3). Fuel continues along the fluid flow face to a fuel exhaust manifold formed by exhaust holes 15. Similarly, an oxidant manifold is formed by oxidant supply holes 10' of each layer 118 within the fuel cell stack. Oxidant, such as oxygen, is supplied to fluid flow region of the cathode side of the fuel cell by flowing oxidant along oxidant manifold (See FIG. 5). Excess oxidant and product water are evacuated from the fluid flow region into an oxidant exhaust manifold formed by exhaust holes 15' (See FIG. 5). Additionally, the fuel cell stack can be cooled by flowing a coolant, such as deionized water, through a coolant manifold formed by coolant holes.

Figure 2:
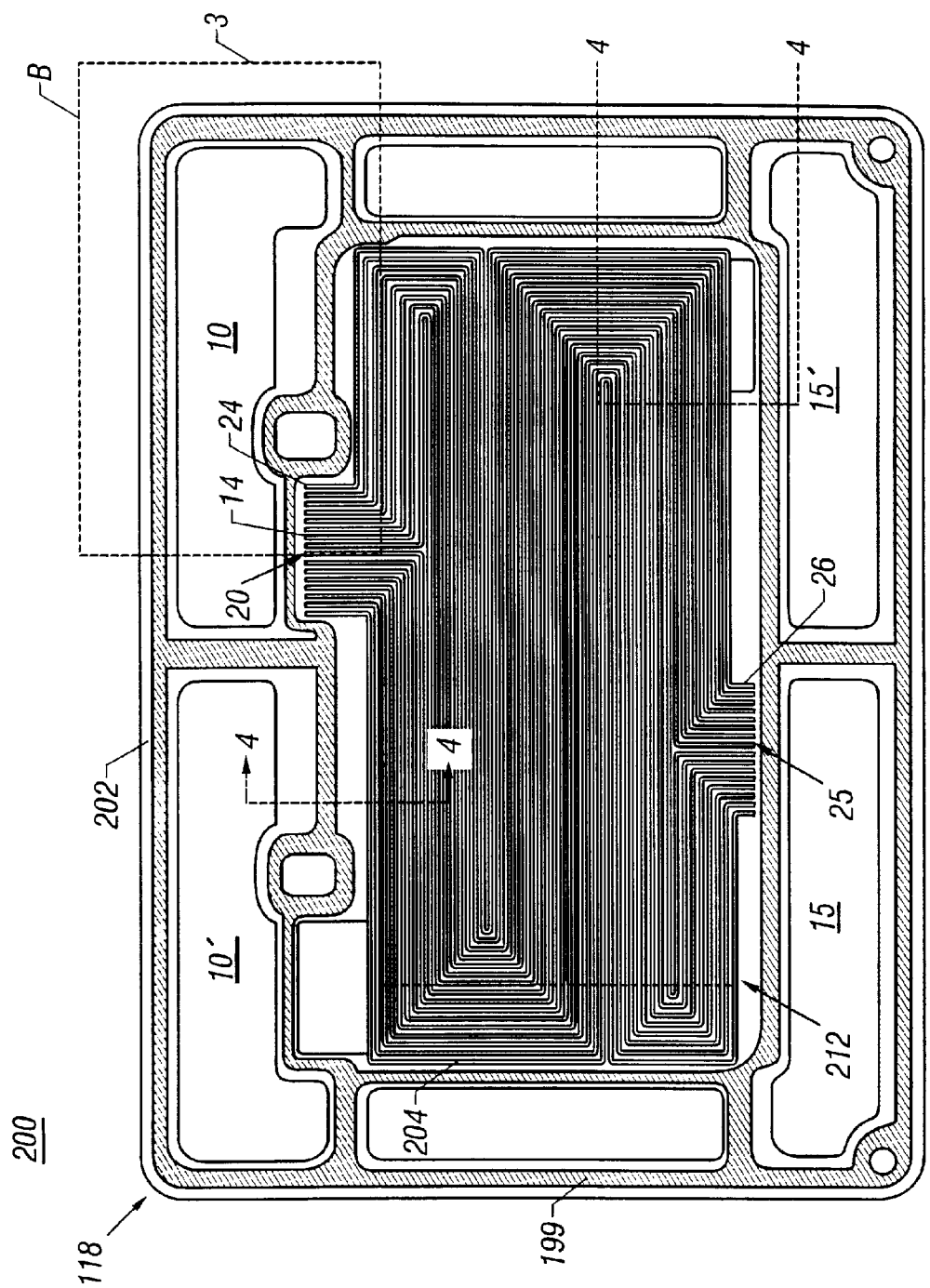
FIG. 2 is an anode fluid flow plate of the fuel cell assembly of FIG. 1.

An example of layer 118 is an anode fluid flow plate 200, shown in FIG. 2. Anode fluid flow plate 200 includes a back face 201 (FIG. 3), a front face 202, fuel supply hole 10, oxidant supply hole 10', fuel exhaust hole 15, and oxidant exhaust hole 15'. Front face 202 includes 16 fluid flow channels 204 formed in a surface 30 of a fluid flow region 212, and a compressible member 199 bonded to face 202 outside the perimeter of fluid flow region 212 to completely circumscribe the fluid flow region. Compressible member 199 also circumscribes the perimeter of fuel supply hole 10, oxidant supply hole 10', fuel exhaust hole 15, and oxidant exhaust hole 15'. An inlet end 24 of flow channel 204 is connected to fuel supply hole 10 by an inlet port 20 and an outlet end 26 of flow channel 204 is connected to fuel exhaust hole 15 by an outlet port 25.

Figure 3:
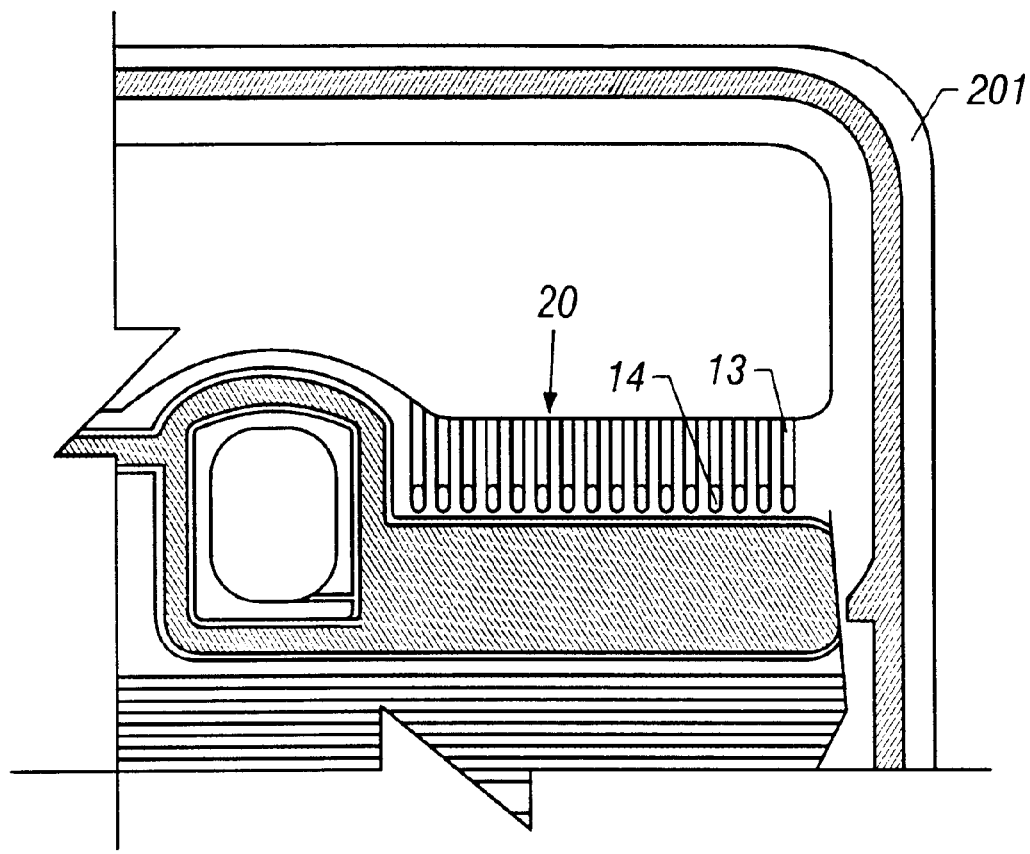
FIG. 3 is an enlarged view of the back face of the anode fluid flow plate of FIG. 2 about section B.

As shown in FIG. 3, inlet port 20 includes several port channels 13 on back face 201 of anode fluid flow plate 200. Port channels 13 extend from supply hole 10 to bore holes 14. Typically, the number of port channels directly corresponds to the number of channels 204 in fluid flow region 212 and each bore hole 14 connects one port channel 13 on back face 201 to one channel 204 on front face 202. Note that outlet port 25, shown in FIG. 2, is similar to inlet port 20.

Figure 4:
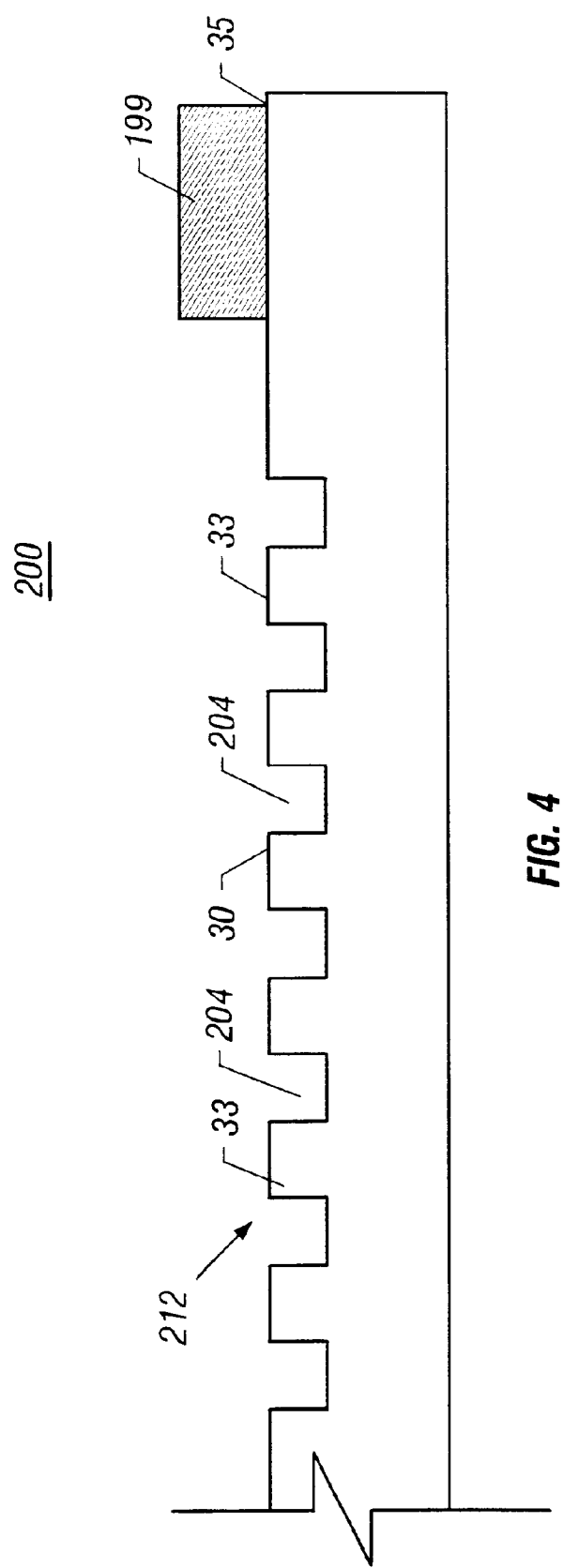
FIG. 4 is a cross-sectional view along sectional line 4—4 of the anode fluid flow plate of FIG. 2.

FIG. 4 shows a cross-sectional view of plate 200. As can be seen, lands 33 separate the different portions of fluid flow channel 204 from each other. Compressible member 199 is bonded to surface 35 of face 202 to improve the fluid seal between the fluid flow plate and the membrane (See FIG. 7).

Figure 6:
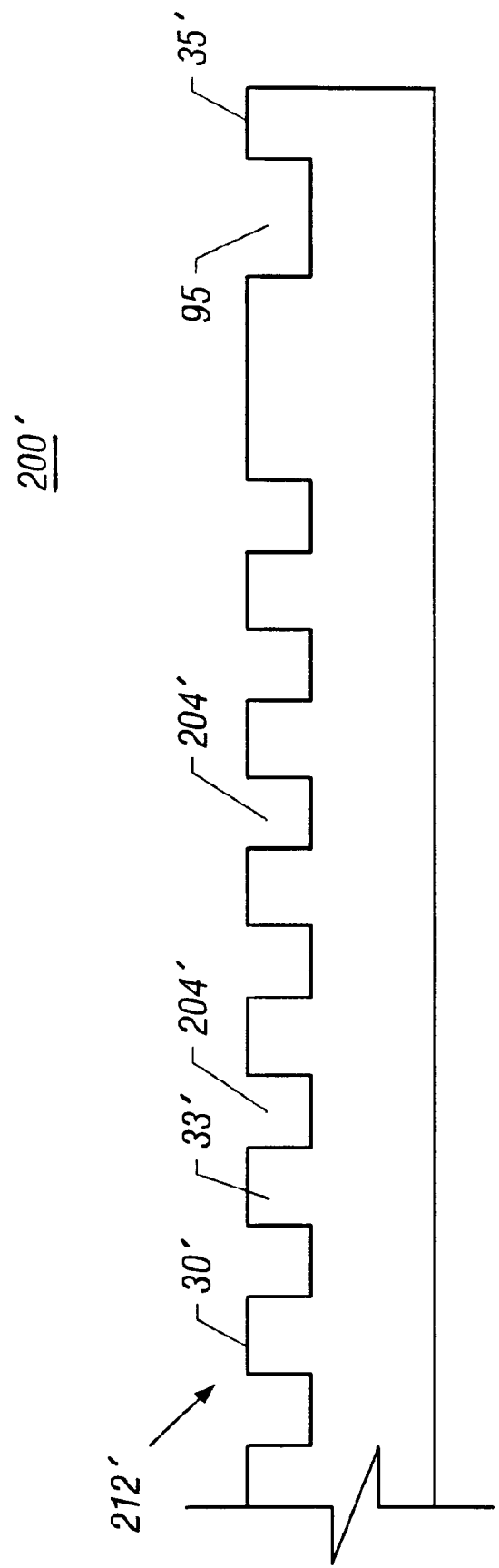
FIG. 6 is a cross-sectional view along sectional line 6—6 of the fluid flow plate of FIG. 5.

Another example of layer 118 is a cathode fluid flow plate 200', shown in FIG. 5. As can be seen, cathode fluid flow plate 200' is very similar to anode fluid flow plate 200. However, on cathode fluid flow plate 200', an inlet end 24' of flow channel 204' is connected to oxidant supply hole 10' through inlet port 20' and an outlet end 26' of flow channel 204' is connected to oxidant exhaust hole 15' through outlet port 25'. Additionally, as shown in FIG. 6, cathode fluid flow plate 200' includes a groove 95 formed in a surface 35' of face 202' outside the perimeter of fluid flow region 212' to completely circumscribe the fluid flow region. On the cathode fluid flow plate, groove 95 extends around the perimeter of fluid flow region 212', supply holes 10, 10', and exhaust holes 15, 15' to mirror the perimeter circumscribed by the anode fluid flow plate's compressible member.

As shown in more detailed view of FIG. 7, PEM-type fuel cell 300 includes a membrane electrode assembly 310 (hereinafter "MEA") sandwiched between a cathode gas diffusion layer 312' (hereafter "GDL") which is in turn sandwiched between an anode assembly 80 and a cathode assembly 90. Anode assembly 80 includes a fluid flow plate 200 and compressible insulator 199. Cathode assembly 90 includes a fluid flow plate 200' and a gasket 110 disposed within groove 95. A membrane electrolyte 306 of MEA 310 extends just beyond the fluid flow regions 212 and 212' of the fluid flow plates such that the membrane electrolyte rests between gasket 110 and compressible member 199. MEA 310 also includes an anode catalyst 308 and a cathode catalyst 308'.

Figure 8:
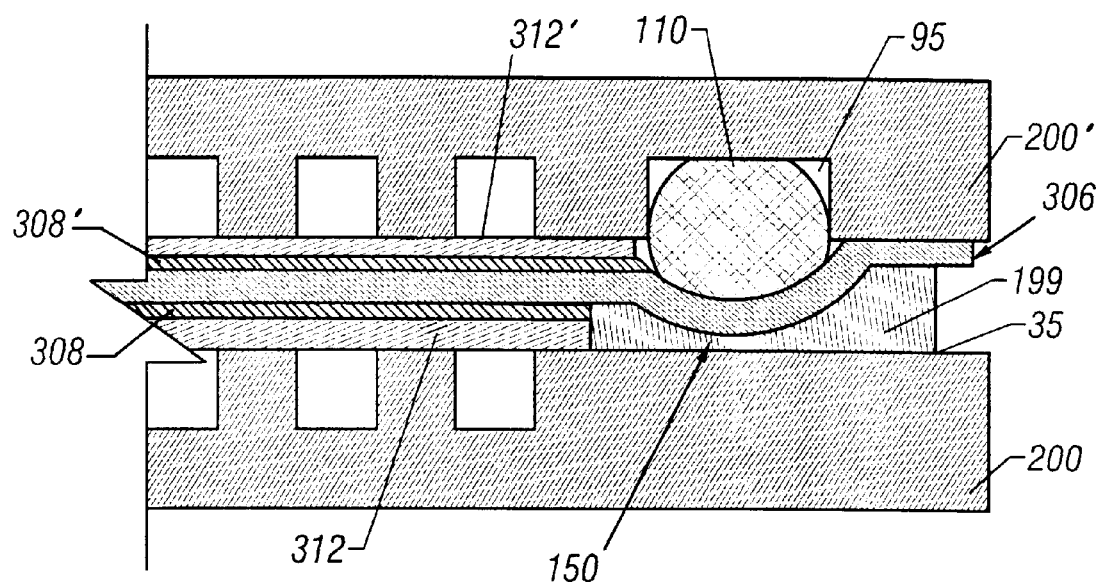
FIG. 8 is an expanded view about section A the PEM-type cell of FIG. 7 under compressive pressure.

During assembly of the fuel cell stack, referring now to FIG. 8, PEM-type cell 300 is compressed (arrows) to form a fluid tight seal 150 between groove 95 of cathode fluid flow plate 200', gasket 110, membrane electrolyte 306, compressible insulator 199, and surface 35 of anode fluid flow plate 200. As the fluid flow plates are compressed towards each other, gasket 110 acts as a point pressure source to compress membrane electrolyte 306 and compressible member 199 such that membrane electrolyte 306 and compressible member 199 conform to the outer surface of gasket 110 to form a fluid tight seal about the fluid flow regions. Additionally, the gasket and compressible member form fluid seals around the supply and exhaust holes (not shown). A fluid tight seal also can be formed between the groove of the cathode fluid flow plate, the gasket, the MEA (including catalysts), the compressible insulator, and the surface of the anode fluid flow plate.

The amount of compressive force applied by gasket 199 to compressible member 100 is selected by changing either the depth of groove 95, the size of gasket 110, or both. The depth and gasket size maybe selected, for example, such that gasket applies 80 to 100 psi of pressure in the region of seal 150 when the fluid flow plates are compressed by 200 psi.

The compressible material 199 bonded to the anode fluid flow plate improves the fluid seal in PEM-type cells by conforming to the shape of the cathode gasket 110. The improved fluid seal decreases the leak rate in the PEM-type cell as compared to PEM-type cells sealed without the compressible member.

The gasket and compressible member may be made from any of a wide range of materials. A key consideration maybe that the gasket and compressible member materials should be compatible with the fuel cell materials, fluids, and operating conditions.

It may also be desirable that the compressible member be made from a material that can adhere or bond to the surface of the fluid flow plate and that will tend to conform to the surface of an object when compressed by that object. It may also be useful if the compressible member is made of a material which sticks or adheres to the surface of the MEA to create an improved fluid seal. And it may also be desirable that the compressive material be made of an electrically insulating material.

Examples of gaskets and compressive member materials include, but are not limited to, polymers, such as EPDM and silicon. Examples of silicon polymers include, but are not limited to, fluorosilicone and silicone.

Additionally, the surface of the fluid flow plate may be roughened so that the compressible material forms a stronger bond to the plate. The entire fluid flow plate surface may be roughened. Alternatively, the surface around the perimeter fluid flow region is roughened and the fluid flow region remains smooth. The surface finish of the fluid flow plate, typically is measured by a profilometer. The surface roughness is quantified in terms of a Roughness Average (RA). Lower RA values correspond to smoother surfaces. The surface roughness of the fluid flow plates, typically is between about 100 and 32 RA.

The dimensions of the compressible member and the gasket depend upon the design of the fuel cell. Typically, the dimensions of the gasket and compressible member are selected such that the compressible member, when compressed against the MEA by the gasket, conforms to the outer shape of the gasket to form a fluid tight seal between the fluid flow plate and the MEA. Additionally, in areas where the compressible member circumscribes the supply and exhaust holes, the compressible member forms a fluid tight seal between the fluid flow plate and the gasket. Thus, the compressible material should be wider than the pressure applying region of the gasket. Typically, the height of the compressible material and the height of gasket material exposed above the fluid flow plate surface are equal to the height of the GDL and the width of the compressible material is greater than the width or diameter of the gasket.

In the described embodiment, the fluid flow regions of each plate can include single or multiple channels. The channel layout is typically formed in a serpentine pattern in which single or multiple channels cross back and forth in the fluid flow plate surface between the inlet and outlet. The purpose of the channel layout is to improve the delivery efficiency of fuel and oxidant to the PEM. Other channel arrangements known in the art are also possible.

Fluid flow plates typically are formed of compressed carbon. Fluid flow plates may be formed of other materials such as non-magnetic, austenitic stainless steel, or titanium. Typically, channels 204 are engraved or milled into a face of an electrically conductive material. Fluid flow plates may also be injection or compression molded. The width, depth, and length of each channel depends upon the design of the fuel cell.

The compressible member may be applied to the fluid flow plate by using various conventional methods known to persons skilled in the art. Conventional methods include, but are not limited to, silk screening, spraying, or rolling.

Fluid flow plates may be formed in accordance with the principles of U.S. application Ser. No. 09/054,670 by Carlstrom (entitled"Easily-Formable Fuel Cell Assembly Fluid Flow Plate Having Conductivity and Increased Non-Conductive Material," filed Apr. 3, 1998, and assigned to Plug Power, L.L.C.), which is hereby incorporated herein by reference in its entirety.

Fluid flow plates include bipolar, monopolar, combined monopolar (e.g., anode cooler or cathode cooler), or cooler plates. For instance, when fluid flow field plate is an anode or a cathode cooler, a back face of the plate supplies cooling to the stack and a front face of the plate acts as either an anode or a cathode. Alternatively, a bipolar plate includes channels on both a front face and a back face. For example, the front face acts as a cathode for one PEM-type cell and the back face acts as an anode for an adjacent PEM-type cell. In this arrangement channels on the front face conduct oxidant and waste product and the channels on the back face conduct fuel.

In the embodiments described above, the solid electrolyte may include a solid polymer electrolyte made with a polymer such as a material manufactured by E. I. DuPont de Nemours Company and sold under the trademark NAFION®. In another example, the solid polymer electrolyte might be formed with a product manufactured by W. L. Gore & Associates (Elkton, Md.) and sold under the trademark GORE-SELECT®. The MEA might be formed with a product manufactured by W. L. Gore & Associates and sold under the trade designation PRIMEA 5510-HS.

EXAMPLES

Example 1

Leak Rate of PEM-type Cells

The leak rate of a PEM-type cell including a compressible member was compared to a PEM-type cell lacking a compressible member.

PEM-type cell (A) was constructed by applying a transfer adhesive, 3M 9460 PC, (0.002 thick) around the perimeter of the fluid flow region of an anode cooler. A 0.015 inch thick silicon polymer, Furon 9731, was applied to the transfer adhesive. A fluorosilicone O-ring having a 0.083 inch diameter was placed in the perimeter groove of a cathode cooler. On the anode side of the cell an extra GDL layer 0.007 inch thick was added to compensate for the silicon polymer thickness. A MEA having a 0.002 inch thickness was inserted between the anode and cathode and the PEM-type cell was compressed with 6400 lbs.

PEM-type cell (B) was constructed by applying a 0.005 inch thick double sided adhesive, 3M 9500, around the perimeter of the fluid flow region of an anode cooler. A 0.010 inch thick insulator, Kynar™, was applied to the double sided adhesive. A fluorosilicone O-ring having a 0.083 inch diameter was placed in the perimeter groove of a cathode cooler. A MEA having a 0.002 thickness was inserted between the anode and cathode and the PEM-type cell was compressed with 8000 lbs.

Leak rates for each PEM-type cell were tested as follows. 10 psi of argon was passed through an inlet sight gage of Lube device F301-07-0 which measured the number of bubbles of argon per second. The output of the bubble meter was connected to the fuel supply hole of the anode side of the PEM-type fuel cell so that argon flowed through the fluid flow region of the anode plate and out the fuel exhaust hole. The oxidant supply hole and oxidant exhaust hole were connected to an output bubble meter which measured the number of bubbles per second of argon passed through the fluid seal from the anode side of the cell to the cathode side of the cell. The number of bubbles per second (B/S) measured by the output bubble meter was used to quantify the leak rate of the anode side of the fuel cell.

The leak rate between the anode side of the fuel cell and the coolant manifold was tested as follows. 10 psi of argon was passed through the bubble meter to the fuel supply hole of the anode side of the PEM-type fuel cell so that argon flowed through the fluid flow region of the anode plate and out the fuel exhaust hole. The coolant holes were connected to an output bubble meter which measured the number of bubbles per second of argon passed through the fluid seal from the anode side of the cell into the coolant manifold.

The leak rate between the cathode side of the cell and the coolant manifold was tested as described above, except that 10 psi of argon was passed into the oxidant supply hole so that argon flowed through the fluid flow region of the cathode plate and out the oxidant exhaust hole. The coolant holes were connected to an output bubble meter which measured the number of bubbles per second of argon passed through the fluid seal from the cathode side of the cell into the coolant manifold.

The results of the leak tests for each PEM-type fuel Cell (A) Leak Rates:

|  | Inlet B/S | Outlet B/S |
| --- | --- | --- |
| Hydrogen-Air | 0.035 | <0.01 |
| Hydrogen-Coolant | 0.23 | <0.01 |
| Air-Coolant | 0.013 | <0.01 |

Cell (B) Leak Rates:

|  | Inlet B/S | Outlet B/S |
| --- | --- | --- |
| Hydrogen-Air | 0.299 | 0.233 |
| Hydrogen-Coolant | 0.205 | 0.018 |
| Air-Coolant | 0.300 | 0.163 |

The leak rate for cell (A) was less than 0.01 bubbles per second. The PEM-type cell including the compressible member decreased the leak rate by a factor of at least 10.

Other Embodiments

In alternative embodiments, the cathode side and anode side of the PEM-type fuel cell may be switched. In this situation, the anode fluid flow plate includes a groove which receives a gasket and a compressible member is bonded to the surface of the cathode fluid flow plate.

In another embodiment, the flow channels can be connected directly to the supply and exhaust holes. In this situation, bridge plates or cover plates are used between the flow channels and the compressible material and the gasket.

Typically, the bridge or cover plates prohibit the compressible material and the gasket from clogging the inlet and outlet ends of the fluid flow channels when the PEM-type cell is compressed. Examples of fuel cells including bridge plates or cover plates is disclosed in U.S. application Ser. No. 08/899,262 which is incorporated herein by reference.

It should be understood that the foregoing description is intended to illustrate and not limit the scope of the invention, which is defined by the following claims. Other aspects, advantages, and modifications are within the scope of the following claims.

What is claimed is:

1. A fluid seal for a fuel cell comprising:
   a first fluid flow plate having a first surface;
   a groove formed in the first surface of the first fluid flow plate;
   a gasket at least partially disposed within the groove of the first fluid flow plate;
   a second fluid flow plate having a first surface; and
   a compressible member bonded to the first surface of the second fluid flow plate, wherein the first surface of the first fluid flow plate is parallel to the first surface of the second fluid flow plate, the compressible member circumscribes a pattern that mirrors the pattern formed by the groove on the first fluid flow plate, and the compressible member conforms to a surface of the gasket.

2. The fluid seal of claim 1, wherein the seal further includes an electrolyte membrane secured between the gasket and the compressible member.

3. The fluid seal of claim 1, wherein the groove circumscribes a perimeter of a fluid flow region of the first fluid flow plate.

4. The fluid seal of claim 3, wherein the seal further includes an electrolyte membrane secured between the gasket and the compressible member.

5. The fluid seal of claim 1, wherein the first and second fluid flow plates each include a fluid supply hole and a fluid exhaust hole.

6. The fluid seal of claim 5, wherein the groove circumscribes the fluid supply hole, the fluid exhaust hole, and a perimeter of a fluid flow region on the first fluid flow plate.

7. The fluid seal of claim 6, wherein the seal further includes an electrolyte membrane secured between the gasket and the compressible member about the perimeter of the fluid flow region.

8. The fluid seal of claim 7, wherein the compressible member sticks to the electrolyte membrane.

9. The fluid seal of claim 1, wherein the second fluid flow plate includes a roughened region and the compressible member is bonded to the roughened region.

10. The fluid seal of claim 1, wherein the compressible member is a silicone polymer.

11. The fluid seal of claim 1, wherein the compressible member is an insulator.

12. An fluid flow plate for a fuel cell comprising:
    a plate made at least in part from an electrically conductive material, said plate having a front surface with one or more open-faced channels formed therein for carrying a reactive gas, said plate further including a supply opening and an exhaust opening, said open-faced channels define a fluid flow region; and
    a compressible material bonded to the plate surface around a perimeter of said fluid flow region, said supply opening, and said exhaust opening.

13. The fluid flow plate of claim 12, wherein the fluid flow plate further includes a roughened surface around the perimeter of the fluid flow region.

14. The fluid flow plate of claim 13, wherein the compressible member is bonded to the roughened surface.

15. The fluid flow plate of claim 12, wherein the compressible member is a silicone polymer.

16. The fluid flow plate of claim 12, wherein the compressible member is an insulator.

17. A method of sealing a fuel cell comprising:
    compressing a first fluid flow plate towards a second fluid flow plate; wherein the first fluid flow plate includes a gasket at least partially disposed within a groove formed in a surface of the first plate and the second fluid flow plate includes a compressible member bonded to a surface of the second fluid flow plate, the compressible member circumscribes a pattern that mirrors the pattern formed by the groove on the first fluid flow plate, and the compressible member conforms to a surface of the gasket as the fluid flow plates are compressed together.

18. The method of claim 17, further including sealing an electrolyte membrane between the gasket and the compressible member.

19. The method of claim 17, wherein the groove circumscribes a perimeter of a fluid flow region of the first fluid flow plate.

20. The method of claim 18, wherein the compressible member sticks to the electrolyte membrane.

21. The method of claim 17, wherein the compressible member is an silicone polymer.

* * * * *